Patented July 6, 1943

2,323,806

UNITED STATES PATENT OFFICE 2,323,806

SATURATED ALIPHATIC HIGHER MONO-AMINOMONOCARBOXYLIC ACID AMINES AND A METHOD FOR THEIR PREPARATION

Mark Wendell Farlow, Wilmington, Del., assignor to E. I. du Pont de Nemours & Company, Wilmington, Del., a corporation of Delaware No Drawing. Application July 18, 1940,
Serial No. 346,144

8 Claims. (Cl. 260—404.5)

This invention relates to certain new and useful long-chain aliphatic aminoacyl compounds and methods for their preparation.

It is an object of this invention to prepare certain new and useful long-chain aminoacyl compounds and to provide direct and simple processes for their preparation. Other objects will be apparent from the following description of the invention.

The above and other objects appearing hereinafter are accomplished by this invention, which comprises reducing in the presence of ammonia or primary amines compounds of the general formula;

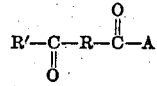

wherein A is —OH, —OR", —NH$_2$, —OM, —ONH$_4$, halogen, or

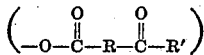

R is a bivalent open-chain organic radical containing at least 4 atoms, preferably from 7 to 13 atoms, R' is a monovalent open-chain organic radical, preferably containing from 3 to 12 atoms, R" is an alkyl group, and M is a metal. Although R and R' may be heteroatomic in nature, containing in addition to carbon, oxygen, nitrogen, and sulfur atoms in the chain, the preferred compounds are those in which R and R' are hydrocarbon radicals.

According to one embodiment of this invention the conversion may be effected by bringing into intimate contact, in the presence of a suitable hydrogenation catalyst at a temperature between room temperature and 200 °C., the long-chain ketoacyl compound, hydrogen, and either ammonia or a primary amine. Alternately, the reduction may be accomplished chemically by treatment with formamide or formamide-forming reactants (i. e. (NH$_4$)$_2$CO$_3$+HCOOH) in accordance with the general procedure as applied to short chain ketones by Leuckart, Ber. 18, 2341 (1885).

The following examples set forth certain well defined instances of the application of this invention. They are, however, not to be considered as limitations thereof since many modifications may be made without departing from the spirit and scope of this invention.

Example I 12-ketostearamide was prepared in accordance with the process described in copending U. S. application Serial No. 346,142, filed on even date herewith. A mixture of 100 parts of 12-ketostearamide, 15 parts alloy-skeleton nickel catalyst, 1.7 parts of ammonium chloride and 213 parts of methanol was placed in a stainless steel autoclave fitted with a stirrer. Anhydrous ammonia (67 parts) was added and the reaction mixture was heated to 130° C. with stirring. Sufficient hydrogen was added to maintain a pressure of 1500–1700 lbs./sq. in., and the reaction mixture was stirred and held at a temperature of 130° C. for 2.5 hours. The reaction mixture was cooled, removed from the autoclave, and the nickel catalyst separated by filtration. The methanol solution was then added with stirring to 1500 parts of water and the precipitated crude 12-aminostearamide was separated by filtration. The crude 12-aminostearamide was treated with a solution of 67 parts of glacial acetic acid in 1000 parts of water as described in copending U. S. application Serial No. 346,139, filed on even date herewith now U. S. Patent No. 2,283,683, issued May 19, 1942, and the insoluble material was removed by filtration. A slight excess of 28% aqueous ammonium hydroxide was added to the well-stirred aqueous acetic acid solution, and the precipitated 12-aminostearamide was separated by filtration. Recrystallization from methanol gave 60 parts of 12-aminostearamide, melting at 86–88° C.

*Analysis.*—Calc'd. for C$_{18}$H$_{38}$ON$_2$: N, 9.39. Found: N, 9.30.

12-aminostearamide is soluble in the lower aliphatic alcohols, benzene, and dilute aqueous organic acids. It crystallizes as sparkling white waxy plates. Hydrolysis with 10% aqueous alkali or acid gives 12-aminostearic acid.

Example II

A mixture of 100 parts of 12-ketostearamide, prepared as described in Example I, 20 parts of anhydrous ammonia and 3 parts of alloy-skeleton nickel catalyst was placed in a metal autoclave. The reaction mixture was heated rapidly to 130° C., hydrogen was added to maintain a pressure of 1700–2000 lbs. sq. in., and the reaction mixture was held at this temperature and pressure for 2 hours. At the end of this time, the mixture was cooled to room temperature, and the crude aminostearamide was removed from the reaction vessel, dissolved in methanol and purified as described in Example I. There was obtained 85 parts of 12-aminostearamide melting at 86–88° C.

Example III

A well-stirred mixture of 100 parts of castor oil and 10 parts of nickel-on-kieselguhr catalyst was treated with hydrogen in a metal autoclave for one hour at a temperature of 130° C. and a pressure of 2000 lbs./sq. in. The pressure was then lowered to atmospheric and dehydrogenation of the 12-hydroxystearin to 12-ketostearin was effected by raising the temperature to 275° C. for 6 hours. The temperature was then lowered, fifty parts of anhydrous ammonia was added, and the reaction mixture was heated at 150° C. for 8 hours to form 12-ketostearamide. At the end of this time, sufficient hydrogen was added to maintain a pressure of 2000 lbs./sq. in. and heating was continued for 3.5 hours at 150° C. The crude 12-aminostearamide thus obtained was purified as described in Example I, there being obtained 35 parts of 12-aminostearamide melting at 86–88° C.

Example IV

9(10)-ketostearamide was prepared from oleic acid by the following procedure. One hundred parts of oleic acid was placed in a 3-necked reaction vessel fitted with a thermometer, stirrer, and dropping funnel. Thirty-three parts of concentrated sulfuric acid was added dropwise with stirring over a period of 1.5 hours, keeping the temperature of the reaction mixture at 10° to 20° C. The reaction mixture was cooled overnight, diluted with 5 times its weight of ice-water, and heated under reflux. The oily upper layer was separated, washed with hot water, and heated with alcoholic potassium hydroxide for one hour. After acidification with dilute sulfuric acid, the oily layer was separated, washed with water, diluted with petroleum ether, and cooled. The material which precipitated was removed by filtration and washed with petroleum ether. There was obtained 55 parts of white crystalline 9(10)-hydroxystearic acid which after recrystallization melted at 78–9° C., and had an acid number of 181.2; 183.1 (theory, 187). A mixture of 100 parts of 9(10)-hydroxystearic acid and 450 parts of methanol was refluxed for 7 hours. During this period, dry hydrogen chloride was added for 5 minutes at the start of the reaction and for 5 minutes each after the second and fifth hours of heating. The reaction mixture was cooled, diluted with a large volume of water, and extracted with ether. The ether solution was washed with aqueous sodium carbonate solution and with water, dried over calcium chloride, and filtered. Distillation of the ether solution gave 88 parts of colorless methyl 9(10)-hydroxystearate boiling at 182° to 184° C. at 1 mm. (M. P. 36–7° C.). The saponification number was 180.0; 179.5 (theory, 178.6), the acid number was 1.4; 1.3 (theory 0.0) and the hydroxyl number was 174.9, 174.0 (theory, 178.6). A mixture of 100 parts of methyl 9(10)-hydroxystearate and 5 parts of nickel-on-kieselguhr catalyst was heated to 285° C. Evolution of hydrogen began at a temperature of about 215° C., and the theoretical amount was evolved in an overall heating schedule of 3 hours. The catalyst was removed by filtration of the molten mixture. Distillation gave 83 parts of colorless methyl 9(10)-ketostearate, boiling at 180–190° C. at 2 mm. The methyl 9(10)-ketostearate had an hydroxyl number of 7.6, 7.4 (theory 0.0), an acid number of 7.6, 7.4 (theory 0.0), and a saponification number of 175.5, 178.0 (theory 179.9). A mixture of 100 parts of methyl 9(10)-ketostearate and 50 parts of anhydrous ammonia was heated in a closed metal reaction vessel with shaking for 6 to 8 hours at 150° C. At the end of this time the excess ammonia was allowed to escape and the crude reaction product was recrystallized from methanol. There was obtained 78.3 parts of 9(10)-ketostearamide (M. P. 95–8° C.).

A mixture of 100 parts of 9(10)-ketostearamide, 43 parts of methanol, 0.5 part of ammonium chloride, 10.6 parts of alloy-skeleton nickel catalyst, and 53 parts of anhydrous ammonia was placed in a closed metal reaction vessel and heated to 140° C. with shaking. Sufficient hydrogen was then added to maintain a pressure of 2000 lbs./sq. in., and heating was continued at 140° C. for 3 hours. At the end of this time, the reaction mixture was removed, dissolved in methanol and filtered to remove the catalyst. The excess methanol was removed by distillation, water was added and the precipitated material was separated by filtration. The crude amino amide was dissolved in a mixture of 53 parts of glacial acetic acid and 2600 parts of water, and the insoluble material was removed by filtration, as described in U. S. application Serial No. 346,139, filed on even date herewith, now U. S. Patent No. 2,283,683, issued May 19, 1942. The filtrate was neutralized with sodium hydroxide, and the precipitated material was removed by filtration, washed with water, and recrystallized from methanol. There was obtained 61.7 parts of white, crystalline 9(10)-aminostearamide melting at 67° C., and soluble in the lower aliphatic alcohols.

*Analysis.*—Calc'd. for $C_{18}H_{38}ON_2$: N, 9.39. Found: N, 9.45.

In the practice of this invention there may be used any compound falling within the general formula

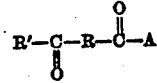

wherein A is —OH, —OR'', —NH$_2$, —OM, —ONH$_4$, halogen or

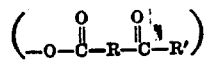

R is a bivalent open chain organic radical containing at least 4 atoms, preferably from 7 to 13 atoms, R' is a monovalent open chain organic radical, preferably containing from 3 to 12 atoms, R'' is an alkyl group, and M is a metal. Although R and R' may be heteroatomic in nature containing in addition to carbon, oxygen, nitrogen, and sulfur atoms in the chain, the preferred compounds are those in which R and R' are hydrocarbon radicals.

Any hydrogenation catalyst may be used to promote the conversion of the ketoacyl compounds to the corresponding aminoacyl compounds. In the examples various types of supported and unsupported nickel catalysts have been employed. In general, any hydrogenating-dehydrogenating metal, such as nickel, cobalt, iron, copper, cadmium, zinc, tin, platinum, palladium, silver, etc., is satisfactory, although nickel catalysts are preferred.

Pressures above the vapor pressure of ammonia may be used for carrying out the reaction. In general, the upper limit of the pressure is determined by the operating safety limit of the apparatus in which the reaction is carried out. In general the reaction may be carried out at temperatures ranging from about 25° C.

to about 200° C., the exact temperature used depending upon the pressure adopted for the reaction as well as upon the catalyst selected. Generally, however, the reaction is carried out at temperatures in the range of 75° to 170° C.

As mentioned in the above examples, various lengths of time may be allotted for the hydrogenation reaction. A period of initial heating with ammonia before introduction of hydrogen may be desirable but is not necessary since satisfactory results are obtained by simultaneous admission of hydrogen and ammonia to the reaction mixture.

In conducting the chemical reduction various substituted formamides and formamide-producing materials may be used; for example, ammonium formate is a very satisfactory reducing agent since it liberates formamide under the reacting conditions.

The products obtained as described herein have the general formula:

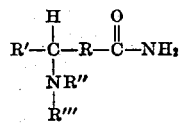

wherein R is a bivalent open chain organic radical containing at least 4 atoms, preferably 7 to 13 atoms, R' is a monovalent open chain organic radical, preferably containing from 3 to 12 atoms, R" is hydrogen or an acyl radical, and R''' is hydrogen or a hydrocarbon radical.

The preferred compounds are those which have a chain length of 18 to 22 atoms and a radical length of 10 to 15 atoms. By radical length is meant the number of atoms in the chain N—C—R—C in the above formula.

Methods for the production of 12-aminostearamide, 12-formylaminostearamide, and 9(10)-aminostearamide have been shown. Examples of other compounds that may be produced by this process include the following amides: N-methyl 12-aminostearamide, N-butyl 12-aminostearamide, N-octyl, N-octadecyl, N-cyclohexyl or N-phenyl 12-aminostearamide, N-9-octadecenyl 12-aminostearamide, 14-aminobehenamide, 11 - aminostearamide, 13-aminostearamide, 9-aminopalmitamide, 9-aminostearamide, 13-aminobehenamide, 9-aminomargaramide, 6-aminopalmitamide, 9-amino - 5 - thiatricosanoamide, 9-amino-5-oxatricosanoamide and 9-amino-12-thiatricosanoamide. In addition to the amides other compounds include ammonium 12-aminostearate and sodium 12-aminostearate, sodium 9(10)-aminostearate, sodium 13(14)-aminobehenate, and ammonium 13(14)-aminobehenate.

The aminoacyl compounds which may be prepared in the manner described above are quite valuable as polyamide intermediates. The extreme chain length and the unique position of the amino group make possible the formation of novel polyamides from these amino amides and from the corresponding amino acids derivable from them. The polyamides have properties which make them very desirable in the coating of fabrics, metals, and miscellaneous materials, as unsupported films and foils, and as durable, tough, elastic fibers, threads, filaments and bristles. In addition, these aminoacyl compounds, particularly the aminoamides and their derivatives are attractive intermediates for the preparation of compounds for various pharmaceutical purposes, bactericides, insecticides, preservatives, etc. The surface activity of such long chain materials also makes them desirable intermediates for the preparation of wetting agents, detergents, and similar materials.

It is apparent that many widely different embodiments of this invention may be made without departing from the spirit and scope thereof and therefore it is not intended that this invention be limited except as indicated in the appended claims.

I claim:

1. As a new compound 12-amino-stearamide.

2. A process which comprises reducing at a temperature within the range of 25 to 200° C. the ketone group to an amino group in compounds of the general formula:

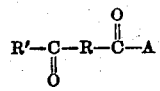

wherein A is selected from the class consisting of —OH, —OR", —NH₂, —OM, —ONH₄, halogen, and

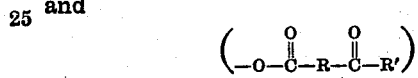

R is a bivalent open chain organic radical containing at least 4 atoms in the chain said radical being selected from the group consisting of hydrocarbon radicals and heteroatomic radicals containing, in addition to carbon atoms, atoms selected from the group consisting of oxygen, nitrogen, and sulfur, R' is an aliphatic monovalent open chain hydrocarbon radical containing 3 to 12 carbon atoms, R" is an alkyl group, and M is a metal.

3. A process which comprises bringing a compound of the general formula

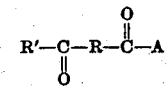

wherein A is selected from the class consisting of —OH, —OR", —NH₂, —OM, —ONH₄, halogen, and

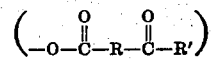

R is a bivalent open chain organic radical containing at least 4 atoms in the chain said radical being selected from the group consisting of hydrocarbon radicals and heteroatomic radicals containing, in addition to carbon atoms, atoms selected from the group consisting of oxygen, nitrogen, and sulfur, R' is an aliphatic monovalent open chain hydrocarbon radical containing 3 to 12 carbon atoms, R" is an alkyl group, and M is a metal, in the liquid phase into contact with hydrogen and a compound selected from the group consisting of ammonia, and primary amines, in the presence of a hydrogenation catalyst at a temperature between 25° and 200° C.

4. The process in accordance with claim 3 characterized in that the reaction is carried out in the presence of ammonia.

5. The process in accordance with claim 3 characterized in that R' has a chain length of 3 to 12 atoms and R a chain length of 7 to 13 atoms.

6. The process in accordance with claim 3 characterized in that the hydrogenation reaction is carried out at a temperature between 75° and 170° C.

7. A process which comprises catalytically hydrogenating at a temperature between room temperature and 200° C., in the liquid phase, in the presence of a compound selected from the group consisting of ammonia and primary amines a keto compound selected from the group consisting of the keto acids, esters, anhydrides, salts, and acid chlorides and having a radical formula corresponding to

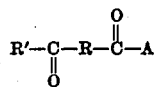

wherein A is selected from the class consisting of —OH, —OR", —NH₂, —OM, —ONH₄, halogen, and

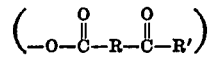

wherein M is a metal and wherein R is a bivalent open chain organic radical containing at least 4 atoms in the chain said radical being selected from the group consisting of hydrocarbon radicals and heteroatomic radicals containing, in addition to carbon atoms, atoms selected from the group consisting of oxygen, nitrogen, and sulfur, and R' is an aliphatic monovalent open chain hydrocarbon radical containing 3 to 12 carbon atoms.

8. A 12-aminostearamide.

MARK WENDELL FARLOW.